United States Patent
Fouotsop et al.

(10) Patent No.: US 8,589,493 B2
(45) Date of Patent: Nov. 19, 2013

(54) SENDING RELATED INFORMATION TO INDIRECT EMAIL RECIPIENTS

(75) Inventors: Meli Henri Fouotsop, Cary, NC (US); Angela Richards Jones, Durham, NC (US); Andrew Lewis Schirmer, Andover, MA (US); Yingxin Xing, Durham, NC (US); Tong Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/840,457

(22) Filed: Aug. 17, 2007

(65) Prior Publication Data

US 2009/0049139 A1     Feb. 19, 2009

(51) Int. Cl.
     *G06F 15/16*      (2006.01)

(52) U.S. Cl.
     USPC ........................................................ 709/206

(58) Field of Classification Search
     None
     See application file for complete search history.

(56) References Cited

U.S. PATENT DOCUMENTS

| | | | |
|---|---|---|---|
| 4,994,985 A * | 2/1991 | Cree et al. ................... | 709/206 |
| 5,864,684 A * | 1/1999 | Nielsen ........................ | 709/206 |
| 5,881,131 A * | 3/1999 | Farris et al. ................ | 379/15.03 |
| 6,138,146 A * | 10/2000 | Moon et al. .................. | 709/206 |
| 6,507,865 B1 * | 1/2003 | Hanson et al. .............. | 705/36 R |
| 6,721,784 B1 * | 4/2004 | Leonard et al. ............. | 709/206 |
| 6,781,972 B1 * | 8/2004 | Anderlind et al. .......... | 370/329 |
| 6,810,408 B1 * | 10/2004 | Bates et al. .................. | 709/200 |
| 6,816,884 B1 * | 11/2004 | Summers ...................... | 709/206 |
| 7,219,302 B1 * | 5/2007 | O'Shaughnessy et al. ... | 715/752 |
| 7,783,711 B2 * | 8/2010 | LeVasseur et al. ........... | 709/206 |
| 7,822,820 B2 * | 10/2010 | LeVasseur et al. ........... | 709/206 |
| 2002/0007453 A1 * | 1/2002 | Nemovicher ................. | 713/155 |
| 2002/0023138 A1 * | 2/2002 | Quine et al. ................. | 709/206 |
| 2002/0110227 A1 * | 8/2002 | Bedingfield et al. ........ | 379/88.19 |
| 2003/0050986 A1 * | 3/2003 | Matthews et al. ............ | 709/206 |
| 2003/0086438 A1 * | 5/2003 | Laumen et al. .............. | 370/462 |
| 2004/0181581 A1 * | 9/2004 | Kosco .......................... | 709/206 |
| 2004/0215734 A1 * | 10/2004 | Nagai et al. .................. | 709/207 |
| 2004/0254989 A1 * | 12/2004 | Baratakke et al. ........... | 709/206 |

(Continued)

OTHER PUBLICATIONS

Lsoft ("Forward-to-a-Friend: Getting Your Message Out", Aug. 16, 2007, http://web.archive.org/web/20070816024420/http://www.lsoft.com/resources/whitepaper.asp, pp. 1-12).*

(Continued)

*Primary Examiner* — Karen Tang
(74) *Attorney, Agent, or Firm* — Marcia L. Doubet

(57) ABSTRACT

Managing the sending of electronic mail (email) messages and responding to requests from indirect recipients for related information. An email message is originated with a first recipient and a recipient request prompt, which comprises a unique recipient request identifier (ID) linking it to the originator's email address. An empty recipient request list is generated, likewise linked to the recipient request ID. The message is then sent to a first recipient, who in turn forwards it to a second recipient. The recipient response prompt is displayed to the second recipient, who uses it to generate a recipient request for related information. The recipient request ID of the originated message and the second recipient's email address are appended to the recipient request, which is then sent to the message originator. The recipient request is received by the email system and parsed. The second recipient's email address is then appended to the recipient request list corresponding to the parsed recipient request ID. The originator is notified of the recipient request and responds accordingly.

14 Claims, 12 Drawing Sheets

(56) References Cited

U.S. PATENT DOCUMENTS

| | | |
|---|---|---|
| 2005/0004837 A1* | 1/2005 | Sweeney et al. ............... 705/14 |
| 2005/0147221 A1* | 7/2005 | Aoki ........................ 379/88.22 |
| 2006/0031349 A1* | 2/2006 | Bailey et al. ................ 709/206 |
| 2006/0090013 A1* | 4/2006 | Achacoso et al. ............... 710/4 |
| 2007/0061366 A1* | 3/2007 | Oden et al. ................ 707/104.1 |
| 2007/0124400 A1* | 5/2007 | Lee ............................. 709/206 |
| 2007/0136430 A1* | 6/2007 | Qureshi et al. ............... 709/206 |
| 2009/0037537 A1* | 2/2009 | Callanan et al. ............. 709/206 |

OTHER PUBLICATIONS

Outlook (Syroid, Tom; Bo Leuf, "Outlook 2000 in a Nutshell", O'Reilly Media, Inc., 2000).*

* cited by examiner

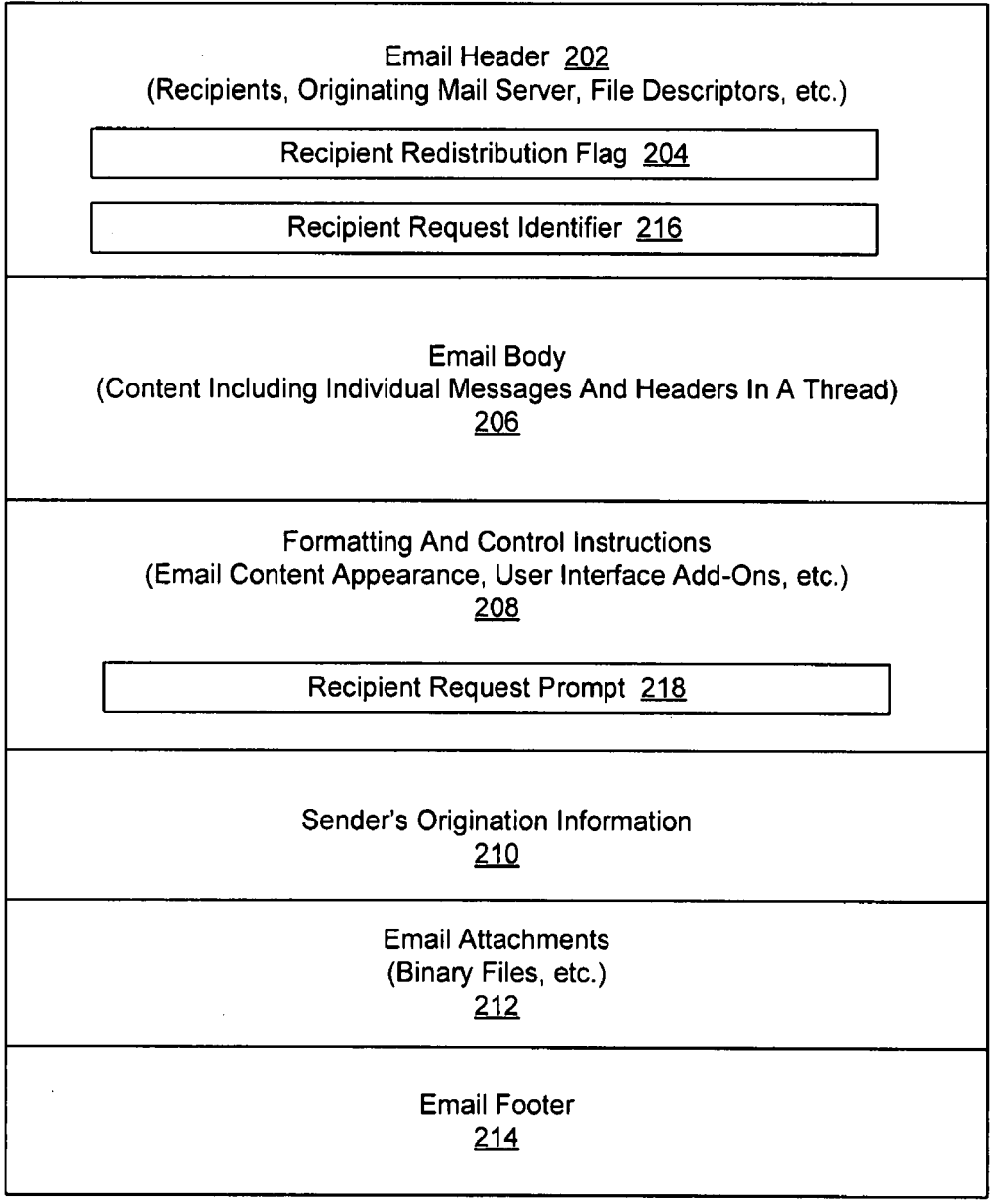

```
┌─────────────────────────────────────────────────────────┐
│                  Email Header  202                       │
│    (Recipients, Originating Mail Server, File Descriptors, etc.) │
│   ┌─────────────────────────────────────────────────┐   │
│   │      Recipient Redistribution Flag  204         │   │
│   └─────────────────────────────────────────────────┘   │
│   ┌─────────────────────────────────────────────────┐   │
│   │      Recipient Request Identifier  216          │   │
│   └─────────────────────────────────────────────────┘   │
├─────────────────────────────────────────────────────────┤
│                                                         │
│                     Email Body                          │
│   (Content Including Individual Messages And Headers In A Thread) │
│                        206                              │
│                                                         │
├─────────────────────────────────────────────────────────┤
│                                                         │
│           Formatting And Control Instructions           │
│   (Email Content Appearance, User Interface Add-Ons, etc.) │
│                        208                              │
│   ┌─────────────────────────────────────────────────┐   │
│   │         Recipient Request Prompt  218           │   │
│   └─────────────────────────────────────────────────┘   │
├─────────────────────────────────────────────────────────┤
│                                                         │
│               Sender's Origination Information          │
│                        210                              │
├─────────────────────────────────────────────────────────┤
│                   Email Attachments                     │
│                   (Binary Files, etc.)                  │
│                        212                              │
├─────────────────────────────────────────────────────────┤
│                                                         │
│                     Email Footer                        │
│                        214                              │
│                                                         │
└─────────────────────────────────────────────────────────┘
```

FIGURE 2

SENDING RELATED INFORMATION TO INDIRECT EMAIL RECIPIENTS

BACKGROUND OF THE INVENTION

1. Field of the Invention

Embodiments of the disclosure relate in general to the field of computers and similar technologies, and in particular to software utilized in this field. Still more particularly, it relates to managing the sending of electronic mail messages and responding to requests for related information.

2. Description of the Related Art

Electronic mail (email) has become a fast, reliable, and easy-to-use method of communication. The growing popularity of email has led to an increase in the volume of email messages, some of which are the result of messages sent indiscriminately to a group list comprising a large of recipients. In some cases, the message may be irrelevant to the recipient. In other cases, the message may contain a mixture of information, some irrelevant and some not, with the result that the recipient is required to peruse the entire message to identify the information that is relevant to them. This issue is commonly addressed in large organizations by having the originator of an email message first send the message to a smaller group of direct recipients. Each of the direct recipients can then make a determination whether to forward the original message, and if so, to whom. Furthermore, the original message may be edited to remove irrelevant content and comments and other information may be added to make the message more relevant to the next recipient. In turn, the indirect recipients of the forwarded message can likewise decide whether to further forward the original message, along with additional comments and edits, to other indirect recipients. This hierarchical approach to email message distribution can help reduce the volume of email messages while increasing the likelihood that the forwarded message content will be relevant to each of its recipients.

However, this approach does not lend itself well to distribution of updates, revisions, or follow-on information as the message originator has no knowledge of who indirectly received the original email. As a result, the originator must rely on the same intermediaries that forwarded the original message to likewise forward any related messages or information. This can prove problematic if the intermediary is unavailable, fails to forward the related information, or cannot remember which indirect recipients received the original forwarded message. Similarly, indirect recipients often have to rely on the same intermediaries to request additional or related information, as the originator's email address may have been removed from the forwarded message. As a result, delays are incurred in receiving the information, and in some cases, the information is never received at all.

Regardless of whether requests for related information are made by intermediaries or indirect recipients, the requests are typically received by the originator in a piecemeal fashion. Responding to these individual requests can be cumbersome, time consuming and inefficient. It would be advantageous if requests for related information could be made directly from the indirect recipient to the message originator, bypassing any intermediaries, even if the originator's email address was unavailable. It would be similarly advantageous if the email addresses of all recipients requesting the same related information were automatically appended to a list that was linked to the original message. Such a linked list would facilitate the message originator in responding to requests. However, these capabilities do not currently exist.

BRIEF SUMMARY OF THE INVENTION

The present invention includes, but is not limited to, a method, system and computer-usable medium for managing the sending of electronic mail (email) messages and responding to requests from indirect recipients for related information. In various embodiments of the invention, an email message is originated comprising a first recipient list. A redistribution flag is set in the header of the originated email message, signifying that it is anticipated that the originated message will be redistributed. A recipient request prompt is generated for indirect recipients to use for requesting information related to the originated message. A unique recipient request identifier (ID) is generated and assigned to the recipient request prompt. The recipient request ID is then appended to the header of the originated email and the recipient request prompt is similarly appended to the originated email message. The email address of the originator, along with other header information, is then linked to the recipient request ID. Once linking and appending operations are completed, an empty recipient request list is generated and likewise linked to the recipient request ID. The originated email message is then sent to the first list of recipients.

The originated email message is then stored in the originator's email Sent box where it is distinguished by the application of a redistribution icon. An originator response prompt, operable for originators to respond to an indirect recipient's request for related information, is generated and appended to the originated message stored in the originator's email Sent box. The originated message is received by a recipient listed in the first recipient list. The recipient response prompt is displayed to the recipient, who uses it to generate a recipient request. The recipient request ID of the originated message is parsed from the originated message header and appended to the recipient request. Similarly, the recipient's email address is parsed from the current email message header and likewise appended to the recipient request. In one embodiment, the originated message is parsed from the forwarded message and appended to the recipient request.

The recipient request is then sent to the originator of the originated email message. The recipient request is received by the email system, which parses the recipient request ID from the recipient request. The recipient email address is then parsed from the recipient request and appended to the recipient list corresponding to the parsed recipient request ID. Once the recipient's email address has been appended to the corresponding recipient request list, a notification message is generated and sent to the email address of the originator of the originated email message. The originator responds to the notification and sends related information to the indirect recipient. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which:

FIG. 2 is a simplified illustration of an electronic mail (email) message including a header as implemented in an embodiment of the invention;

DETAILED DESCRIPTION

Figure 1:
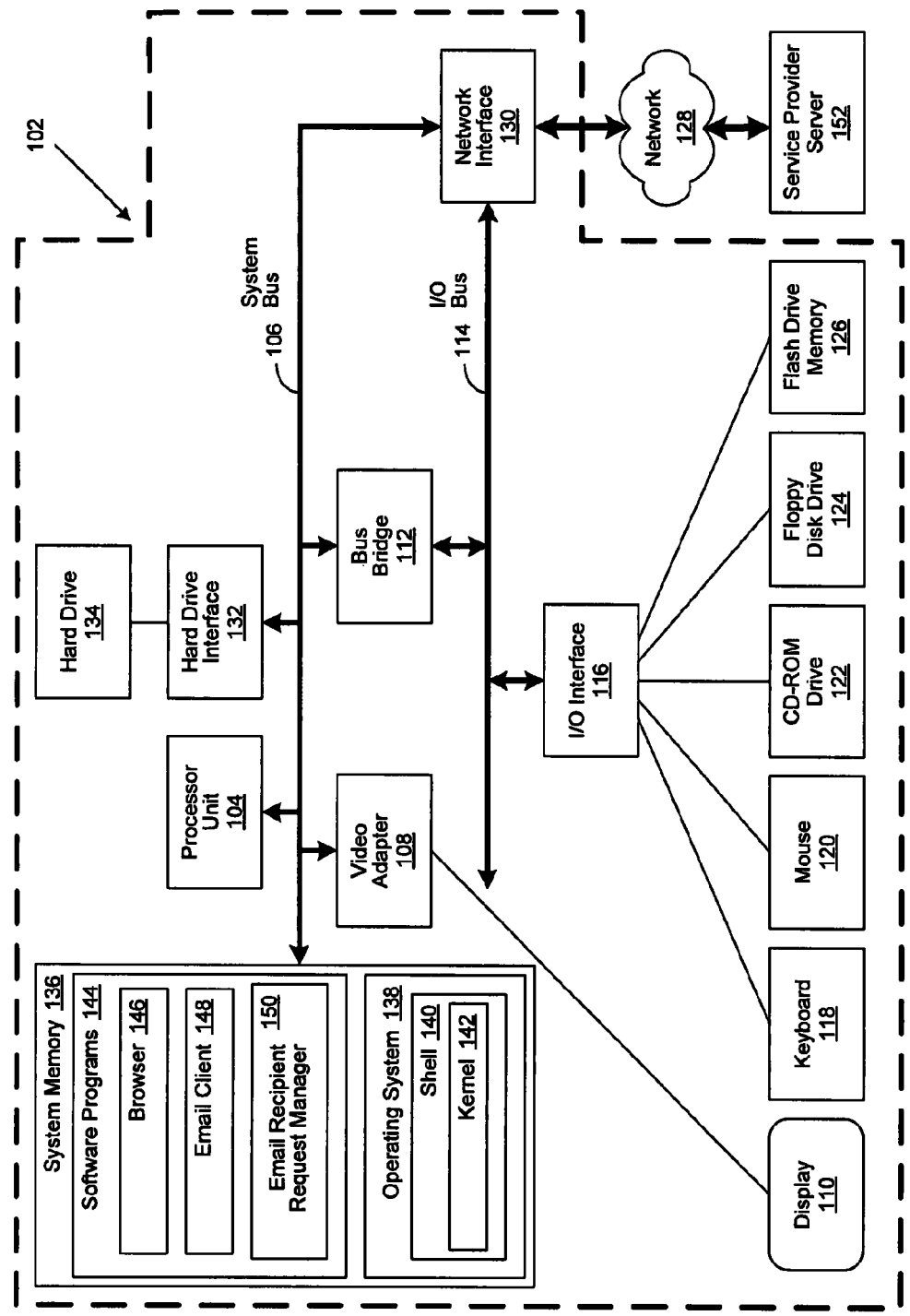
FIG. 1 depicts an exemplary client computer in which the present invention may be implemented.

A method, system, and computer-usable medium are disclosed for managing the sending of electronic mail (email) messages and responding to requests from indirect recipients for related information. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy, and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include an electronic mail (email) recipient request manager 150. The email recipient request manager 150 includes code for implementing the processes described in FIGS. 2 through 7 described hereinbelow. In one embodiment, client computer 102 is able to download email recipient request manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

FIG. 2 is a simplified illustration of an electronic mail (email) message including a header as implemented in accordance with an embodiment of the invention. In various embodiments of the invention, email message file 200 comprises email header 202, email body 206, formatting instructions 208, sender's origination information 210, email attachments 212, and email footer 214. The email header 202 typically comprises the email addresses of the email recipients, the sender's originating mail server, file descriptors, and other related information required to deliver and process the email for use by the recipient. In different embodiments of the invention, email header 202 also comprises recipient distribution flag 204, which is set to signify that redistribution of an email message 202 to indirect recipients is anticipated. Email header 202 also comprises a unique recipient request identifier 216, which is assigned to the recipient request prompt 218 contained in formatting and control instructions 208. The recipient request prompt 218 is typically implemented as a graphical user interface (GUI) prompt for use by indirect recipients to request follow-on or additional information related to the email message 202.

The email body 206 typically comprises text, with embedded binary files such as pictures and charts attached as binary file attachments 212. The formatting instructions 208 typically comprise instructions processed by an email client for the presentation of message content comprising email body 206, binary file attachments 212, and recipient request prompt 218. Sender's origination information 210 generally comprises metainformation such as the address of the sender's originating email server, or a pointer to one or more email directories or other databases.

Figure 3:
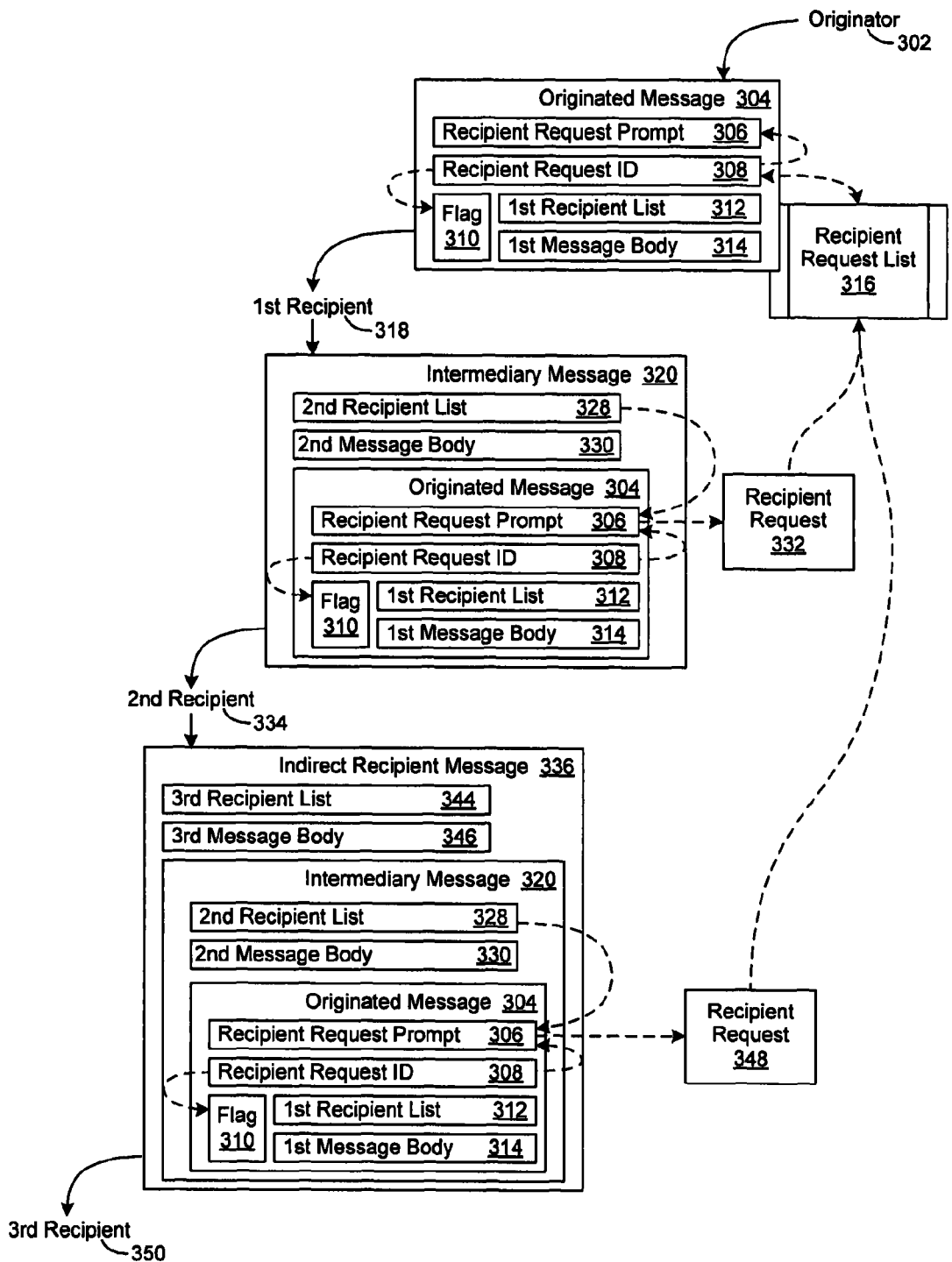
FIG. 3 shows a generalized block diagram of an email message with a redistribution flag that is forwarded to an indirect recipient.

FIG. 3 shows a generalized block diagram of an email message with a redistribution flag that is forwarded to an indirect recipient according to an embodiment of the invention. In this embodiment, an email message originator 302 originates an originated email message 304 comprising a redistribution flag 310, first recipient list 312, and a first message body 314. In various embodiments of the invention the redistribution flag 310 is set to signify that redistribution of the originated email message 304 to indirect second recipient 334 and indirect third recipient 350 is anticipated. Originated email message 304 also comprises recipient request prompt 306, such as a GUI prompt for indirect recipients to use for requesting follow-on or additional information related to the originated email message 304. Likewise, originated email message 304 comprises a unique recipient request identifier (ID) 308, which is assigned to the recipient request prompt 306. In this and other embodiments, an empty recipient request list 316 is generated and linked to the recipient request ID 308. Once the foregoing generation and linking operations are completed, the originated email message 304 is sent to the first recipient 318.

The first recipient 318 receives the originated email message 304 and generates an intermediary message 320 to forward originated email message 304 to a second recipient 334. Intermediary message 320 comprises a second recipient list 328, a second message body 330, and originated email message 304. When the second recipient 334 receives the intermediary message 320, the recipient response prompt 306 contained in originated email message 304 is displayed. The displayed recipient request prompt 306 is then used by the second recipient 334 to generate a recipient request 332. The recipient request ID 308 of the originated email message is parsed from the originated email message 304 and appended to the recipient request 332. Similarly, the second recipient's 334 email address is parsed from the second recipient list 328 and likewise appended to the recipient request 332. The recipient request 332 is then sent to the originator 302 of the originated email message 304. The recipient request 332 is received by the originator's email system, which parses the recipient request ID 308 from the recipient request 332. The email address of the second recipient 334 appended to the recipient request 332 is then appended to the recipient list 316 corresponding to the parsed recipient request ID 308.

Similarly, if the second recipient 334 decides to forward the originated email message 304 to a third recipient 350, then the second recipient 334 generates an indirect recipient message 336. Indirect recipient message 336 comprises a third recipient list 344, a third message body 346, and intermediary message 320, which further comprises originated email message 304. When the third recipient 350 receives the indirect recipient message 336, the recipient response prompt 306 contained in originated email message 304 is displayed. The displayed recipient request prompt 306 is then used by the third recipient 350 to generate a recipient request 348. The recipient request ID 308 of the originated email message is parsed from the originated email message 304 and appended to the recipient request 348. Similarly, the third recipient's 350 email address is parsed from the third recipient list 344 and likewise appended to the recipient request 348. The recipient request 348 is then sent to the originator 302 of the originated email message 304. The recipient request 348 is received by the originator's email system, which parses the recipient request ID 308 from the recipient request 348. The email address of the third recipient 350 appended to the recipient request 348 is then appended to the recipient list 316 corresponding to the parsed recipient request ID 308.

Figure 4A:
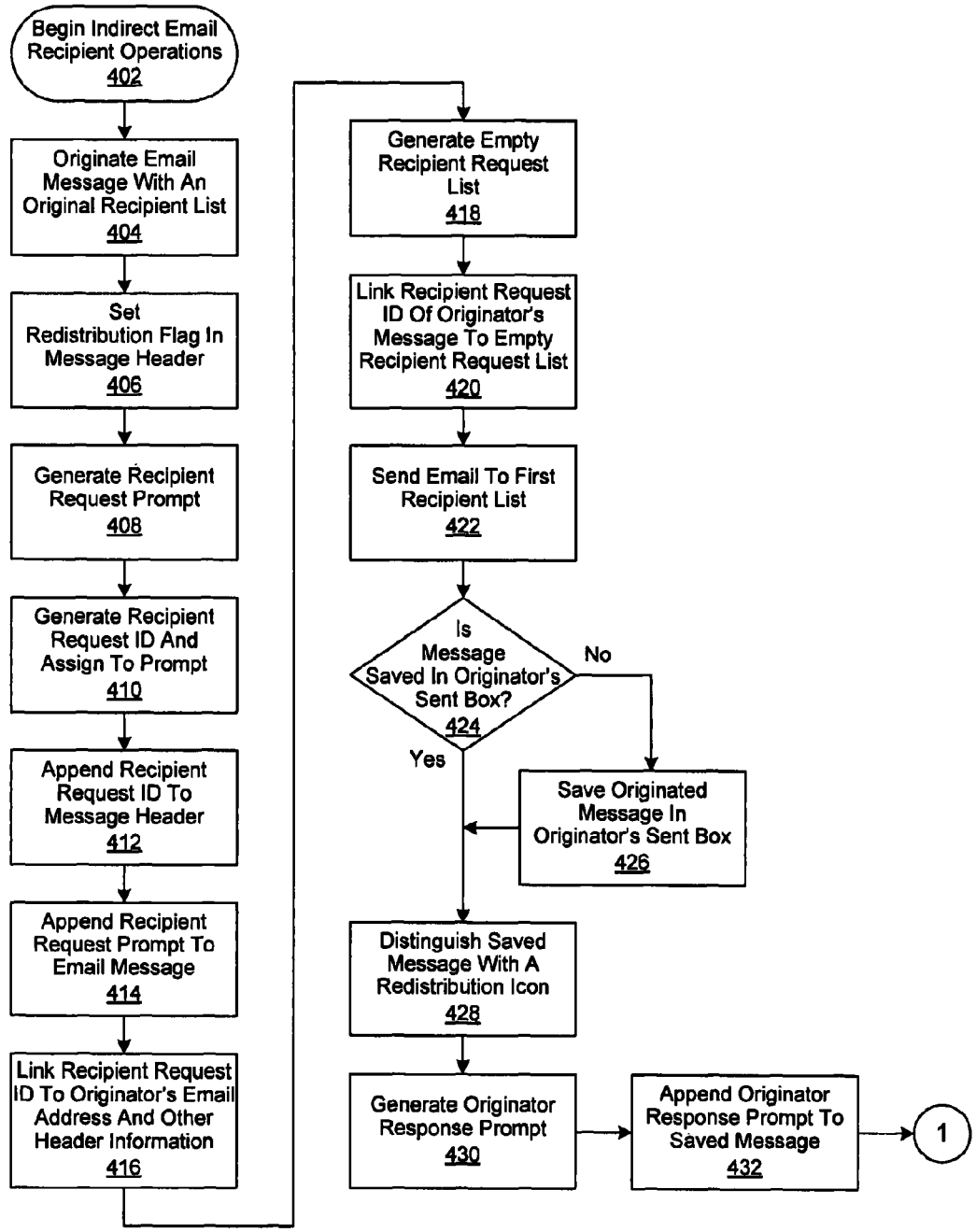
FIGS. 4a-c are a generalized flowchart of an email message with a redistribution flag that is forwarded to an indirect recipient.
Figure 4B:
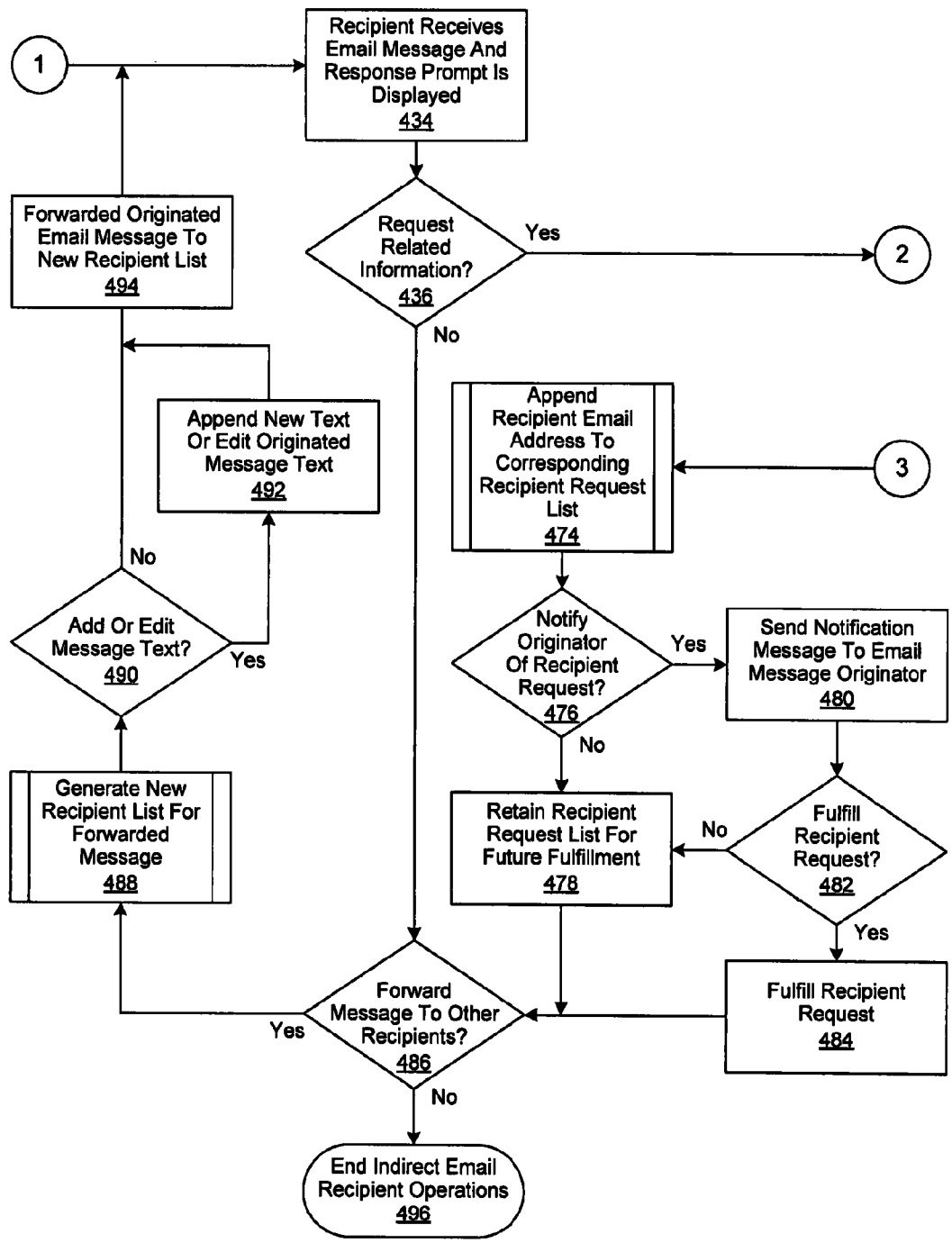
Figure 4C:
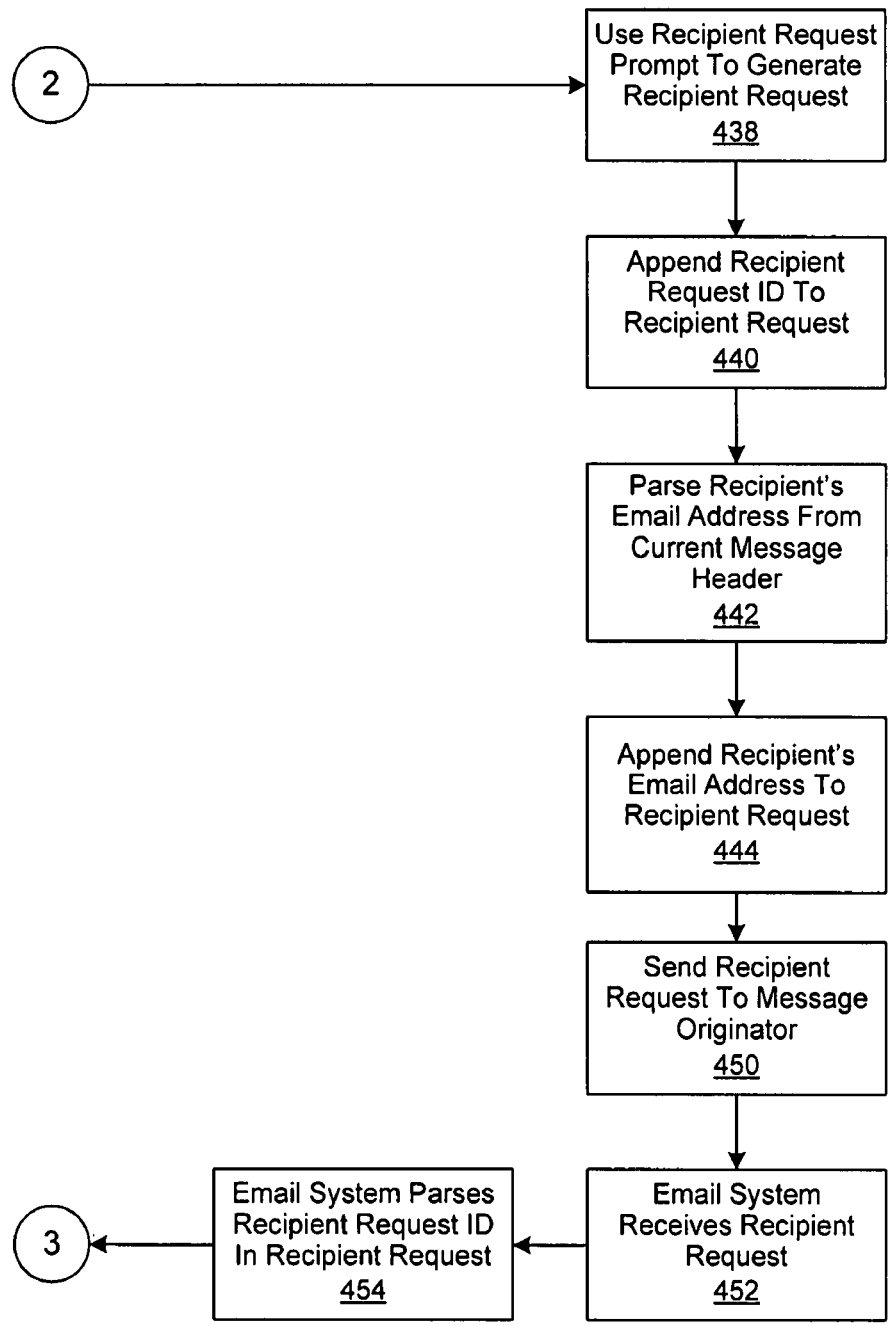

FIGS. 4a-c are a generalized flowchart of an electronic mail (email) message with a redistribution flag that is forwarded to an indirect recipient according to an embodiment of the invention. In this embodiment, indirect email recipient operations are begun in step 402, followed by the origination of an email message comprising an original recipient list in step 404. Skilled practitioners of the art will appreciate that the origination of the email message, and the generation of the original recipient list, can be achieved either by a user or by an automated email system or other software application. Once originated, a redistribution flag is set in the header of the originated email message in step 406, signifying that redistribution of the originated email message to indirect recipients is anticipated. A recipient request prompt, such as a GUI prompt for indirect recipients to use for requesting follow-on or additional information related to the originated email message, is then generated in step 408. A unique recipient request identifier (ID) is generated in step 410 and assigned to the recipient request prompt. The recipient request ID is then appended to the header of the originated email in step 412 and the recipient request prompt is similarly appended to the email message in step 414. The email address of the originator, along with other header information of the originated email message, is then linked to the recipient request ID in step 416. Once the foregoing linking and appending operations are completed, an empty recipient request list is generated in step 418 and linked to the recipient request ID in step 420. Then the originated email message is sent to the first list of recipients in step 422.

A determination is then made in step 424 whether the originated email message has been stored in the originator's email Sent box. If not, then the originated email message is stored in the originator's email Sent box in step 426. If it is determined in step 424 that the originated email message has already been stored in the originator's email Sent box, or once it has been stored in step 426, it is then distinguished by the application of a redistribution icon in step 428. An originator response prompt, such as a GUI prompt for originators to use for responding to an indirect recipient's request for follow-on or additional information related to the originated email message, is generated in step 430. Once generated, the originator response prompt is appended in step 432 to the originated message stored in the originator's email Sent box.

A recipient listed in the original recipient list of the originated message receives the message in step 434 and the recipient response prompt is displayed. A determination is then made in step 436 whether the recipient wishes to request related or follow-on information associated with the originated message. If so, the displayed recipient request prompt is used in step 438 by the recipient to generate a recipient request. The recipient request ID of the originated message is parsed from the originated message header and appended to the recipient request in step 440. Similarly, the recipient's email address is parsed from the current email message header in step 442 and likewise appended to the recipient request in step 444. The recipient request is then sent to the originator of the originated email message in step 450. The recipient request is received by the email system in step 452 and the email system parses the recipient request ID from the recipient request in step 454. Those of skill in the art will recognize that the process of receiving of the recipient request, and subsequent recipient request processing operations, can be performed within an email server, the originator's email client, other software applications, or any combination thereof. Skilled practitioners of the art will likewise realize that many such combinations are possible and that different embodiments of the invention will implement different combinations thereof.

The recipient email address appended to the recipient request is then appended in step 474 to the recipient request list corresponding to the parsed recipient request ID. Once the recipient's email address has been appended to the corresponding recipient request list, a determination is made in step 476 whether to notify the originator of the originated email message of the recipient request. If so, then in step 480, a notification message is generated and sent to the email address of the originator of the originated email message. A determination is then made in step 482 whether to fulfill the recipient request. If so, then the recipient request is fulfilled in step 484. If it is determined in step 476 not to send a notification message to the originator of the originated message, or if it is decided in step 482 not to fulfill the recipient request, then the recipient request list is retained in step 478 for future fulfillment.

If it is determined in step 436 to not request related information, or if the recipient request is fulfilled in step 484, or if the recipient request list is retained for future fulfillment in step 478, then a determination is made in step 486 whether to forward the originated email message to other recipients. If so, then a recipient list to receive the forwarded originated message is generated in step 488. A determination is then made in step 490 whether to append new message text or to edit the message text of the originated message. If so, then new message text is appended, existing text of the originated message text is edited, or both, in step 492. Once text appending and editing operations are completed, the originated message is forwarded to the new recipient list in step 494 and the process is continued, beginning with step 434. However, if it is determined in step 486 not to forward the originated message to other recipients, then indirect email recipient operations are ended in step 496.

Figure 5:
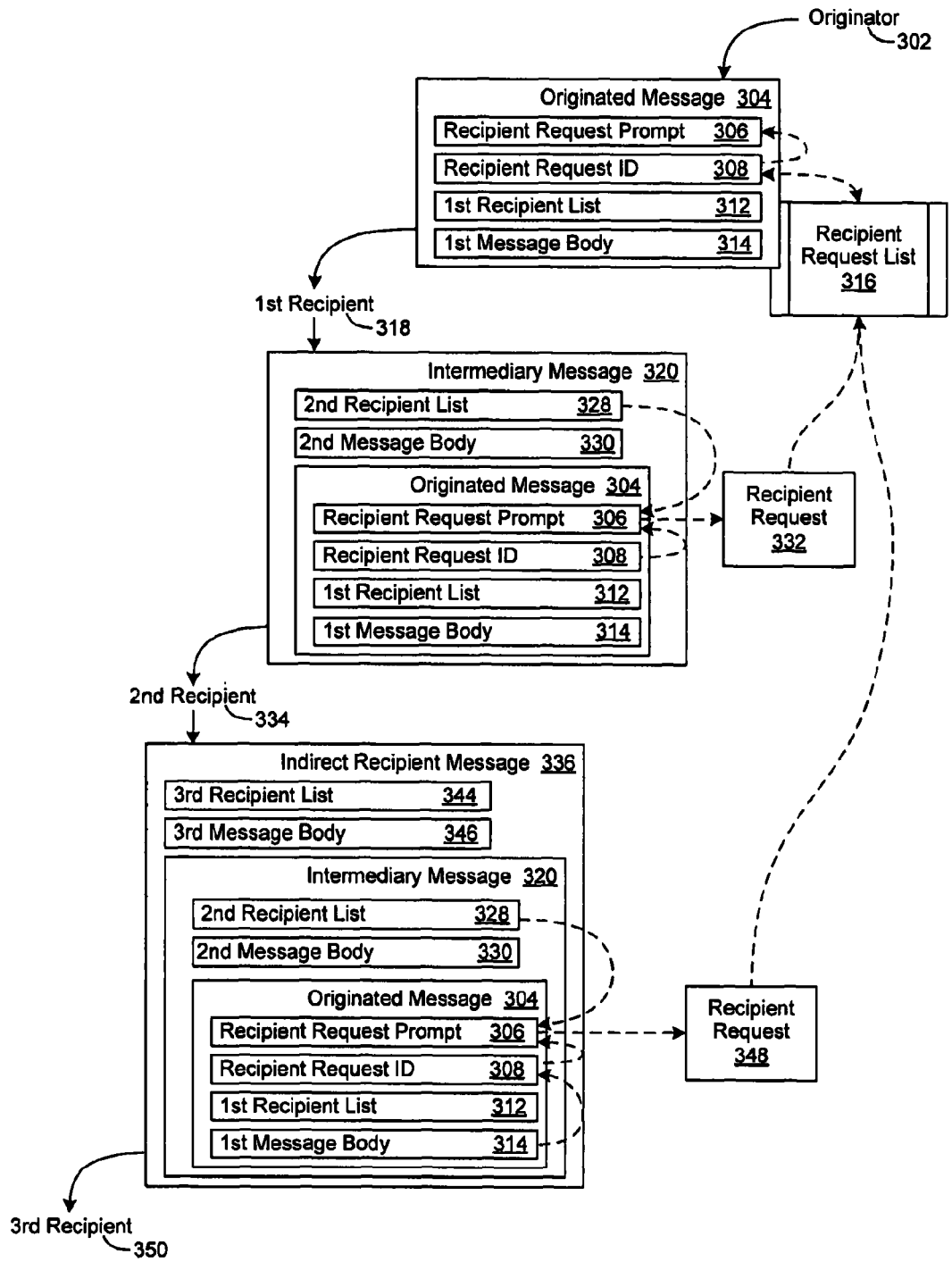
FIG. 5 shows a generalized block diagram of an email message without a redistribution flag that is forwarded to an indirect recipient.
Figure 6A:
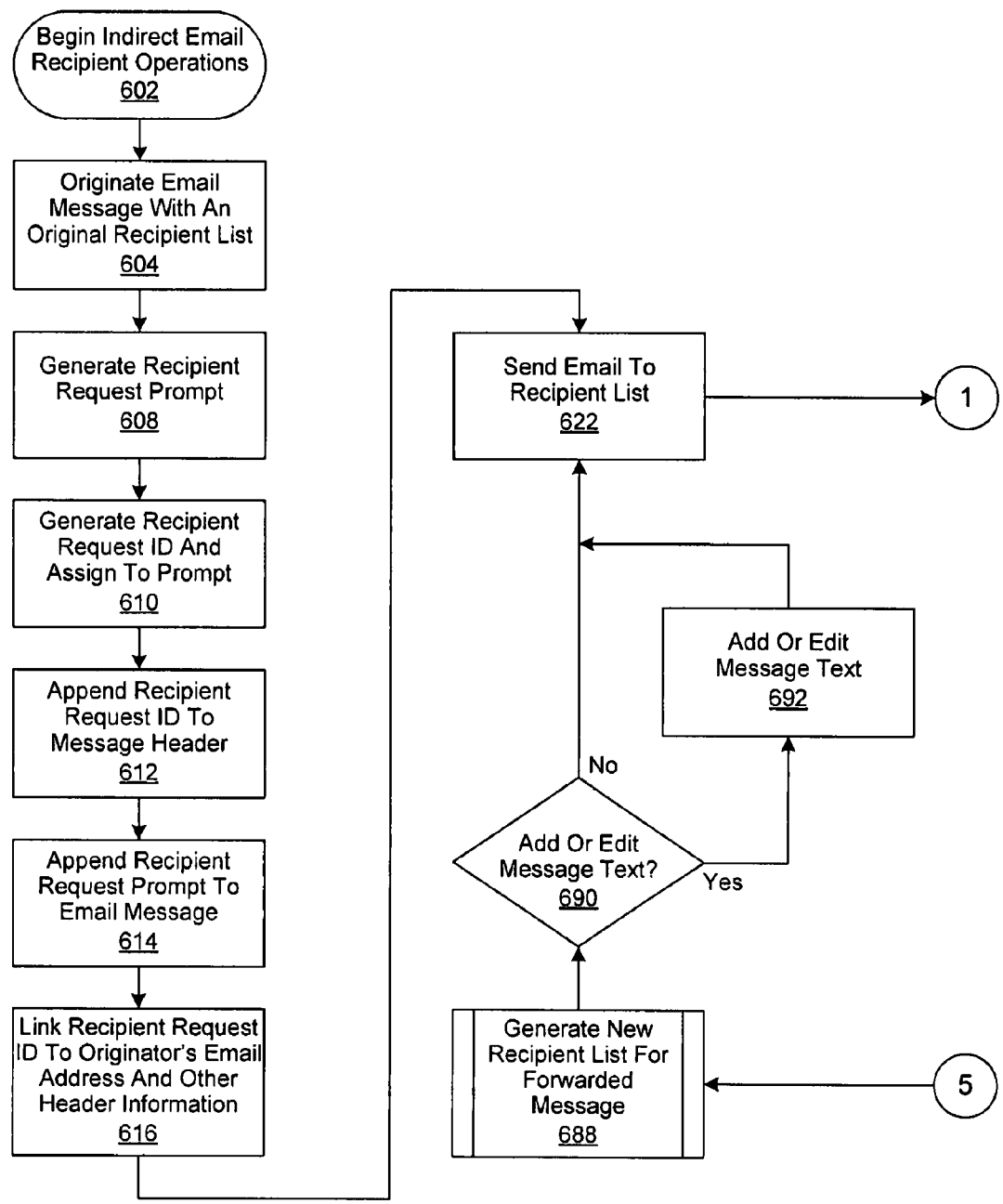
FIGS. 6a-d are a generalized flowchart of an email message without a redistribution flag that is forwarded to an indirect recipient.
Figure 6B:
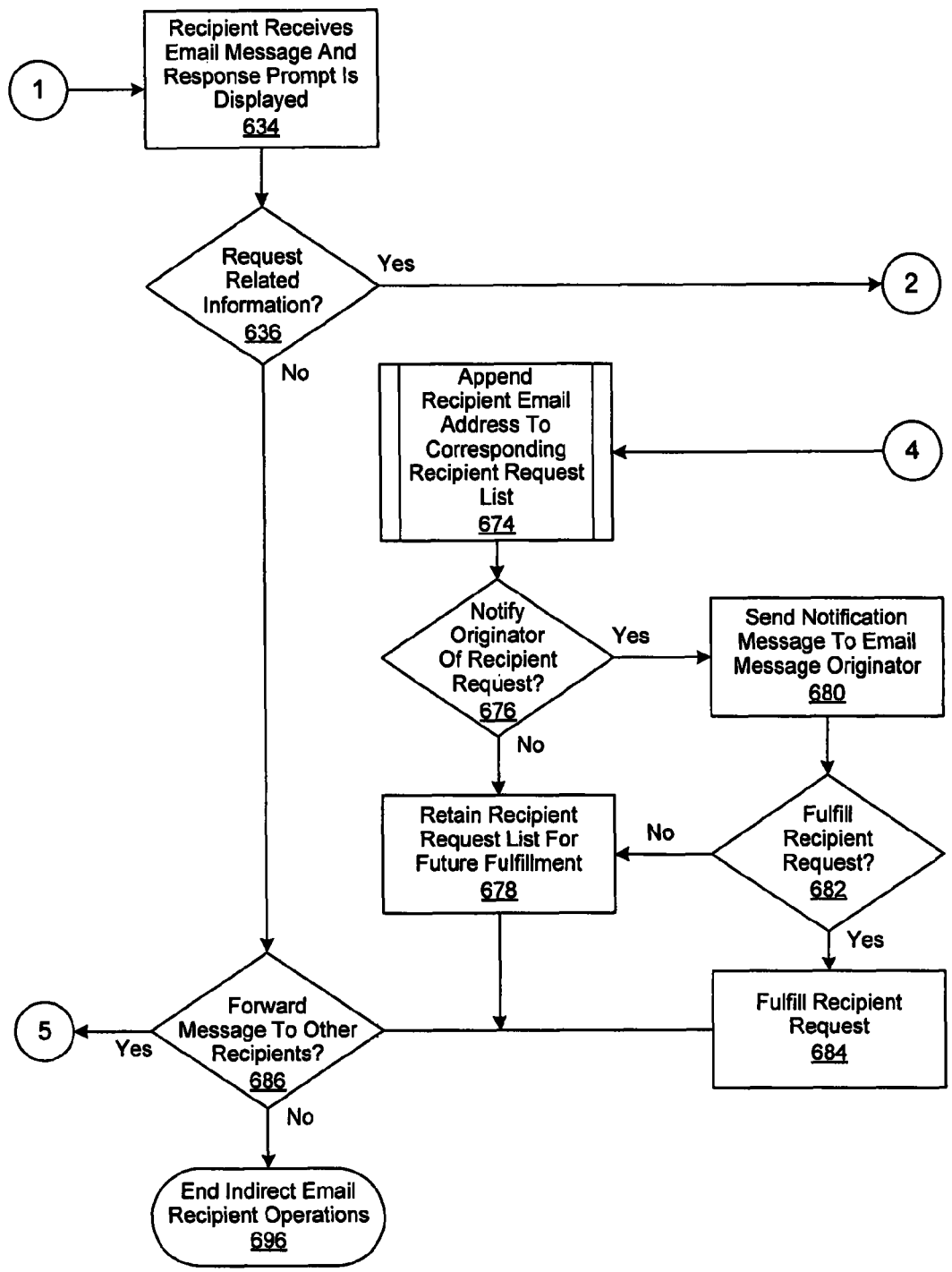
Figure 6C:
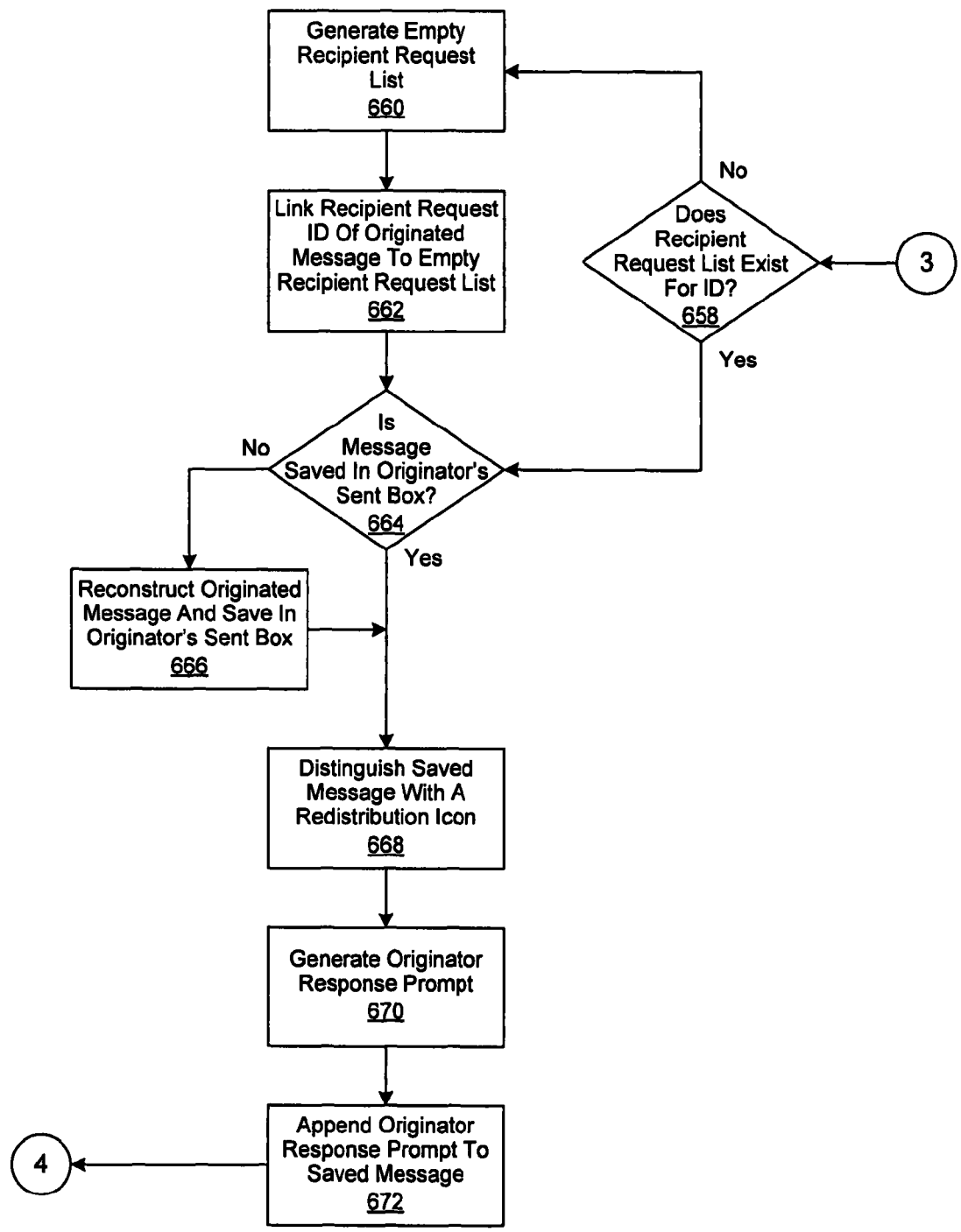
Figure 6D:
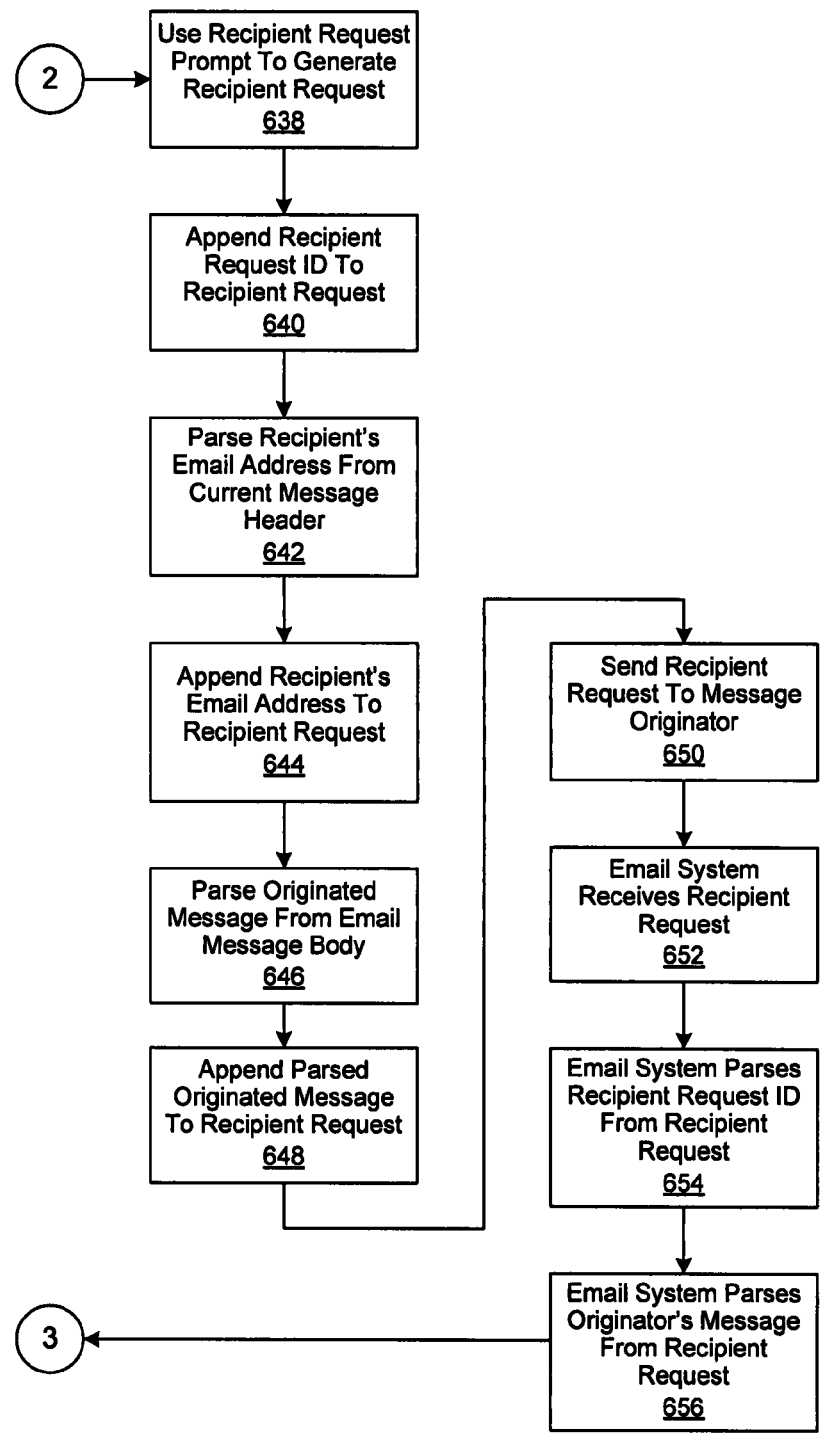

FIG. 5 shows a generalized block diagram of an email message without a redistribution flag that is forwarded to an indirect recipient according to an embodiment of the invention. In this embodiment, an email message originator 302 originates an originated message 304 comprising a first recipient list 312 and a first message body 314. Originated message 304 also comprises recipient request prompt 306, such as a GUI prompt for indirect recipients to use for requesting follow-on or additional information related to the originated message 304. Likewise, originated message 304 comprises a unique recipient request identifier (ID) 308, which is assigned to the recipient request prompt 306. In this and other embodiments, an empty recipient request list 316 is generated and linked to the recipient request ID 308. Once the foregoing generation and linking operations are completed, the originated email message 304 is sent to the first recipient 318.

The first recipient 318 receives the originated message 304 and generates an intermediary message 320 to forward originated message 304 to a second recipient 334. Intermediary message 320 comprises a second recipient list 328, a second message body 330, and originated message 304. When the second recipient 334 receives the intermediary message 320, the recipient response prompt 306 contained in originated message 304 is displayed. The displayed recipient request prompt 306 is then used by the second recipient 334 to generate a recipient request 332. The recipient request ID 308 of the originated message is parsed from the originated message 304 and appended to the recipient request 332. Similarly, the second recipient's 334 email address is parsed from the second recipient list 328 and likewise appended to the recipient request 332. The recipient request 332 is then sent to the originator 302 of the originated email message 304. The recipient request 332 is received by the originator's email system, which parses the recipient request ID 308 from the recipient request 332. The email address of the second recipient 334 appended to the recipient request 332 is then appended to the recipient list 316 corresponding to the parsed recipient request ID 308.

Similarly, if the second recipient 334 decides to forward the originated message 304 to a third recipient 350, then the second recipient 334 generates an indirect recipient message 336. Indirect recipient message 336 comprises a third recipient list 344, a third message body 346, and intermediary message 320, which further comprises originated message 304. When the third recipient 350 receives the indirect recipient message 336, the recipient response prompt 306 contained in originated message 304 is displayed. The displayed recipient request prompt 306 is then used by the third recipient 350 to generate a recipient request 348. The recipient request ID 308 of the originated message is parsed from the originated message 304 and appended to the recipient request 348. Similarly, the third recipient's 350 email address is parsed from the third recipient list 344 and likewise appended to the recipient request 348. The recipient request 348 is then sent to the originator 302 of the originated email message 304. The recipient request 348 is received by the originator's email system, which parses the recipient request ID 308 from the recipient request 348. The email address of the third recipient 350 appended to the recipient request 348 is then appended to the recipient list 316 corresponding to the parsed recipient request ID 308.

FIGS. 6a-d are a generalized flowchart of an email message without a redistribution flag that is forwarded to an indirect recipient according to an embodiment of the invention. In this embodiment, indirect email recipient operations are begun in step 602, followed by the origination of an email message comprising an original recipient list in step 604. Skilled practitioners of the art will appreciate that the origination of the email message, and the generation of the original recipient list, can be achieved either by a user or by an automated email system or other software application. A recipient request prompt, such as a GUI prompt for indirect recipients to use for requesting follow-on or additional information related to the originated message, is then generated in step 608. A unique recipient request identifier (ID) is generated in step 610 and assigned to the recipient request prompt. The recipient request ID is then appended to the header of the originated email in step 612 and the recipient request prompt is similarly appended to the email message in step 614. The email address of the originator, along with other header information of the originated message, is then linked to the recipient request ID in step 616. The originated email message is then sent to the first list of recipients in step 622.

A recipient listed in the original recipient list of the originated message receives the message in step 634 and the recipient response prompt is displayed. A determination is then made in step 636 whether the recipient wishes to request related or follow-on information associated with the originated message. If so, the displayed recipient request prompt is used in step 638 by the recipient to generate a recipient request. The recipient request ID of the originated message is parsed from the originated message header and appended to the recipient request in step 640. Similarly, the recipient's email address is parsed from the current email message header in step 642 and likewise appended to the recipient request in step 644. In a like manner, the originated message is parsed from the current email message body in step 646 and appended to the recipient request in step 648. Once the foregoing parsing and appending operations are completed, the recipient request is then sent to the originator of the originated email message in step 650. The recipient request is received by the email system in step 652 and the email system parses the recipient request ID from the recipient request in step 654 and the originated message from the recipient request in step 656. Those of skill in the art will recognize that the process of receiving of the recipient request, and subsequent recipient request processing operations, can be performed within an email server, the originator's email client, other software applications, or any combination thereof. Skilled practitioners of the art will likewise realize that many such combinations are possible and that different embodiments of the invention will implement different combinations thereof.

A determination is then made in step 658 whether a recipient request list currently exists that corresponds to the parsed recipient request ID. If it is determined that a corresponding recipient request list does not currently exist, then an empty recipient request list is generated in step 660. The generated recipient request list is then linked to the parsed recipient request ID in step 662. A determination is then made in step 664 whether the originated email message has been stored in the originator's email Sent box. If not, then the parsed originated email message is used to reconstruct the originated email message, which is then stored in the originator's email Sent box in step 666. If it is determined in step 664 that the originated email message has already been stored in the originator's email Sent box, or once it has been reconstructed and stored in step 666, it is then distinguished by the application of a redistribution icon in step 668. An originator response prompt, such as a GUI prompt for originators to use for responding to an indirect recipient's request for follow-on or additional information related to the originated message, is generated in step 670. Once generated, the originator response prompt is appended in step 672 to the originated message stored in the originator's email Sent box.

The recipient email address appended to the recipient request is then appended in step 674 to the recipient request list corresponding to the parsed recipient request ID. Once the recipient's email address has been appended to the corresponding recipient request list, a determination is made in step 676 whether to notify the originator of the originated email message of the recipient request. If so, then at step 680, a notification message is generated and sent to the email address of the originator of the originated email message. A determination is then made in step 682 whether to fulfill the recipient request. If so, then the recipient request is fulfilled in step 684. If it is determined in step 676 not to send a notification message to the originator of the originated message, or if it is decided in step 682 not to fulfill the recipient request, then the recipient request list is retained in step 678 for future fulfillment.

If it is determined in step 636 to not request related information, or if the recipient request is fulfilled in step 684, or if the recipient request list is retained for future fulfillment in step 678, then a determination is made in step 686 whether to forward the originated email message to other recipients. If so, then a recipient list to receive the forwarded originated message is generated in step 688. A determination is then made in step 690 whether to append new message text or to edit the message text of the originated message. If so, then new message text is appended, existing text of the originated message text is edited, or both, in step 692. Once text appending and editing operations are completed, the originated message is forwarded to the new recipient list in step 622 and the process is continued, beginning with step 634. However, if it is determined in step 686 not to forward the originated message to other recipients, then indirect email recipient operations are ended in step 696.

Figure 7:
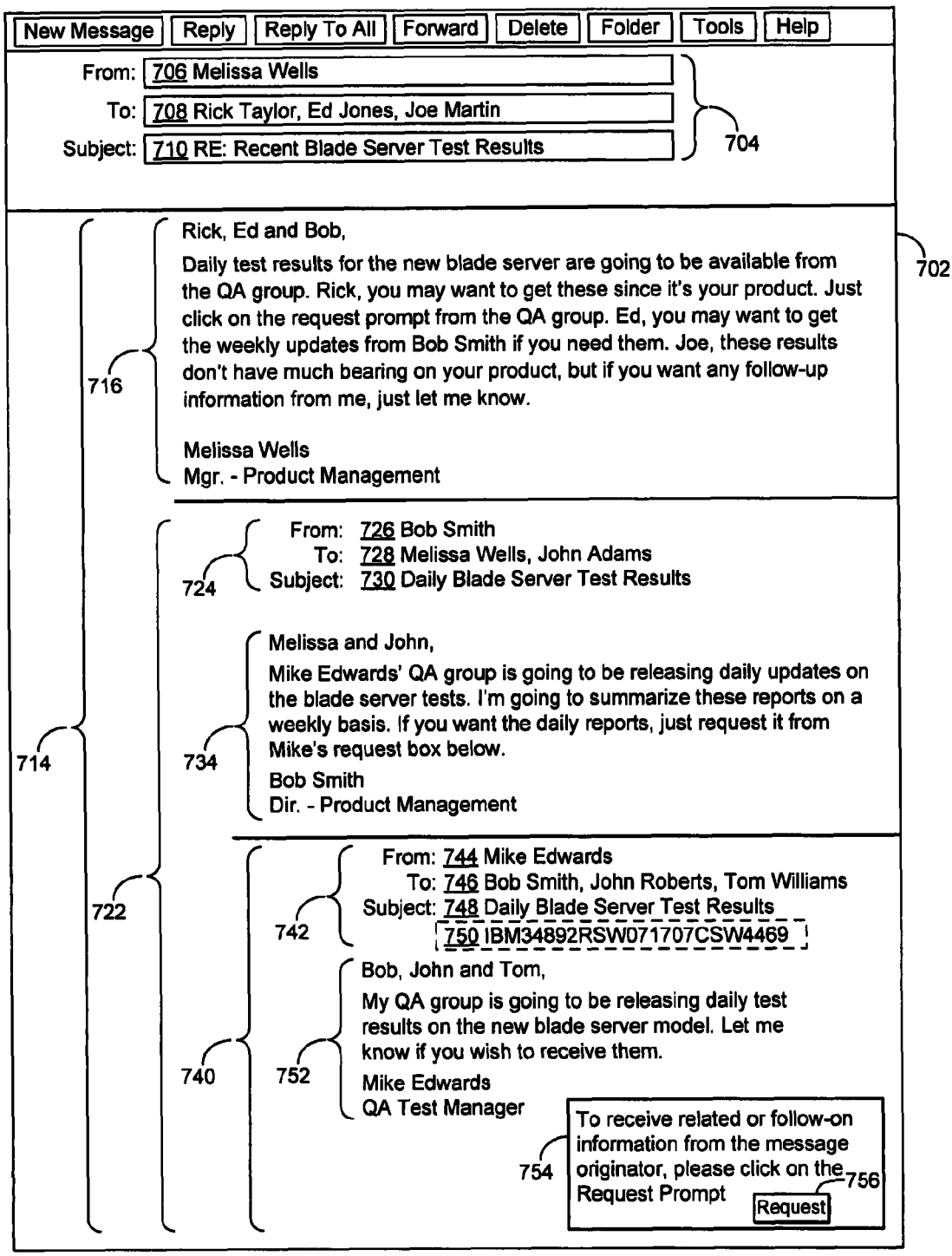
FIG. 7 shows a simplified user interface (UI) of an email client as implemented with a recipient request prompt.

FIG. 7 shows a simplified user interface (UI) 702 of an email client as implemented with a recipient request prompt 754 in accordance with an embodiment of the present invention. In this embodiment, email client UI 702 comprises header information 704 and email message body 714, further comprising email message body 716 and forwarded email message 722. Email header information 704 comprises the email address of the sender 706, a list of recipients 708, and a subject field 710. The forwarded email message 722 comprises forwarded message header information 724, forwarded message body 734, and originated email message 740. Forwarded email header information 724 comprises the email address of the sender 726, a list of recipients 728, and a subject field 730.

In various embodiments, an email message originator originates email message 740, comprising originated message header 742, message body 752 and recipient request prompt 754. Message header 742 further comprises the originator's email address 744, a recipient list 746 containing one or more recipients, a subject field 748, and a unique recipient request identifier (ID) 750. As described in greater detail herein, the unique recipient request ID 750 is assigned to recipient request prompt 754, and is linked to the originator's email address 744, and other originated message header 742 information. In this embodiment, recipient request prompt 754 is implemented as a GUI prompt for direct recipients 746 and indirect recipients 728, 708 to use for requesting follow-on or additional information related to the originated email message 740.

As illustrated in FIG. 7, originated message 740 has been sent by the originator 744 to a first list of recipients 746. One of the recipients 746 has added message text 734 to originated message 740, which has been forwarded as message 722 to indirect recipients 728. One of the indirect recipients 728 has added message text 716 to the message 722, which in turn has been forwarded as message 714 to indirect recipients 708. In this and other embodiments, recipient request prompt 754 is presented to direct recipients 746 and indirect recipients 728, 708 and is used to generate a recipient request for related or follow-on information associated with originated message 740. For example, one of the indirect recipients 708 receives the originated message 740 as part of an email thread 714 and is presented recipient request prompt 754. The indirect recipient then indicates a desire to receive related or follow-on information through a user gesture, such as a mouse click on request button 756. As a result, the recipient request prompt 754 generates a recipient request as described in greater detail herein, and appends the recipient request ID 750 along with the requesting recipient's email address. The recipient request is then forwarded to originator 744 of the originated email message 740. Once received by the email system, the recipient's email address is added to a recipient request list corresponding to the recipient request ID 750.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to explain best the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing electronic mail (email) messages comprising:

enabling origination of a first email message using a computer system of an email message originator, the first email message comprising a unique recipient request identifier and a recipient request prompt assigned thereto;

linking a recipient request list to the first email message using the unique recipient request identifier;

sending the first email message from the computer system of the email message originator to a first recipient;

enabling the first recipient to forward the first email message to a second recipient as a forwarded email message, the forwarded email message comprising the unique recipient request identifier and the recipient request prompt assigned thereto;

receiving the forwarded email message by the second recipient;

enabling the second recipient to generate a recipient request using the recipient request prompt in the forwarded email message;

appending, to the recipient request, the recipient request identifier and an email address of the second recipient;

sending the recipient request to the email message originator, at an address determined based on the unique recipient request identifier;

responsive to receiving the recipient request at the address of the email message originator, parsing therefrom the recipient request identifier and the email address of the second recipient and appending the email address of the second recipient to the recipient request list; and using the recipient request list to send a second email message, as a response to the received recipient request, from the email message originator directly to the email address of the second recipient, bypassing the first recipient.

2. The method of claim 1, wherein:

the first email message further comprises:

a redistribution flag signifying anticipated forwarding of the first email message; and an originator response prompt usable by the email message originator for responding to recipients having email addresses appended to the recipient request list; and further comprising:

saving the sent first email message in a sent box of the email message originator; and applying an icon to the saved first email message indicating that the saved first email message comprises the redistribution flag.

3. The method of claim 1, wherein the appending to the recipient request further comprises appending, to the recipient request, the forwarded email message.

4. The method of claim 2, wherein:

the linking is performed responsive to the receiving the recipient request at the address of the email message originator; and the sending of the second email message is initiated
using the originator response prompt
from the saved first email message in the sent box of the email message originator.

5. A system comprising:

a processor;

a data bus coupled to the processor; and a computer-usable storage medium embodying computer program code, the computer-usable storage medium being non-transitory, the computer-usable medium being coupled to the data bus, the computer program code managing the sending of electronic mail (email) messages and comprising instructions executable by the processor and configured for:

enabling origination of a first email message by an email message originator, the first email message comprising a unique recipient request identifier and a recipient request prompt assigned thereto;

linking a recipient request list to the first email message using the unique recipient request identifier;

sending the first email message from a computer system of the email message originator to a first recipient;

enabling the first recipient to forward the first email message to a second recipient as a forwarded email message, the forwarded email message comprising the unique recipient request identifier and the recipient request prompt assigned thereto;

receiving the forwarded email message by the second recipient;

enabling the second recipient to generate a recipient using the recipient request prompt in the forwarded email message;

appending, to the recipient request, the recipient request identifier and an email address of the second recipient;

sending the recipient request to the email message originator, at an address determined based on the unique recipient request identifier;

responsive to receiving the recipient request at the address of the email message originator, parsing therefrom the recipient request identifier and the email address of the second recipient and appending the email address of the second recipient to the recipient request list; and using the recipient request list to send a second email message, as a response to the received recipient request, from the email message originator directly to the email address of the second recipient, bypassing the first recipient.

6. The system of claim 5, wherein:

the first email message further comprises:

a redistribution flag signifying anticipated forwarding of the first email message; and an originator response prompt usable by the email message originator for responding to recipients having email addresses appended to the recipient request list; and the instructions are further configured for:

saving the sent first email message in a sent box of the email message originator; and applying an icon to the saved first email message indicating that the saved first email message comprises the redistribution flag.

7. The system of claim 5, wherein the appending to the recipient request further comprises appending, to the recipient request, the forwarded email message.

8. The system of claim 6, wherein:

the linking is performed responsive to the receiving the recipient request at the address of the email message originator; and the sending of the second email message is initiated
using the originator response prompt
from the saved first email message in the sent box of the email message originator.

9. A computer-usable storage medium embodying computer program code, the computer-usable storage medium being non-transitory, the computer program code comprising computer executable instructions configured for:

enabling origination of a first email message by an email message originator, the first email message comprising a unique recipient request identifier and a recipient request prompt assigned thereto;

linking a recipient request list to the first email message using the unique recipient request identifier;

sending the first email message from a computer system of the email message originator to a first recipient, the unique recipient request identifier of the first email message adapted to enable a second recipient that receives the first email message from the first recipient as a forwarded email message to generate a recipient request using the recipient request prompt in the forwarded email message and to append, to the recipient request, the recipient request identifier and an email address of the second recipient;

responsive to receiving the recipient request at an address of the email message originator, the address of the email message originator determined based on the unique recipient request identifier, parsing therefrom the recipient request identifier and the email address of the second recipient and appending the email address of the second recipient to the recipient request list; and using the recipient request list to send a second email message, as a response to the received recipient request, from the email message originator directly to the email address of the second recipient, bypassing the first recipient.

10. The computer usable storage medium of claim 9, wherein:

the first email message further comprises:

a redistribution flag signifying anticipated forwarding of the first email message; and an originator response prompt usable by the email message originator for responding to recipients having email addresses appended to the recipient request list; and the computer executable instructions are further configured for:

saving the sent first email message in a sent box of the email message originator; and applying an icon to the saved first email message indicating that the saved first email message comprises the redistribution flag.

11. The computer usable storage medium of claim 9, wherein the appending to the recipient request further comprises appending, to the recipient request, the forwarded email message.

12. The computer usable storage medium of claim 10, wherein:

the linking is performed responsive to the receiving the recipient request at the address of the email message originator; and the sending of the second email message is initiated using the originator response prompt from the saved first email message in the sent box of the email message originator.

13. The computer usable storage medium of claim 9, wherein the computer executable instructions are deployable to a client computer from a server at a remote location.

14. The computer usable storage medium of claim 9, wherein the computer executable instructions are provided by a service provider to a customer on an on-demand basis.

\* \* \* \* \*